US010489216B2

(12) United States Patent
Bryant et al.

(10) Patent No.: US 10,489,216 B2
(45) Date of Patent: Nov. 26, 2019

(54) VERSION-CONTROLLING STORAGE VOLUME SNAPSHOTS

(71) Applicant: International Business Machines Corporation, Armonk, NY (US)

(72) Inventors: Jay S. Bryant, Rochester, MN (US); James E. Carey, Rochester, MN (US); Zachary A. Hill, Muskegon, MI (US); Kendall J. Nelson, St. Paul, MN (US); Lucas A. Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/358,401

(22) Filed: Nov. 22, 2016

(65) Prior Publication Data

US 2018/0143883 A1    May 24, 2018

(51) Int. Cl.
   *G06F 16/30*    (2019.01)
   *G06F 9/50*    (2006.01)
   *G06F 11/14*    (2006.01)

(52) U.S. Cl.
   CPC ........ *G06F 9/5077* (2013.01); *G06F 11/1438* (2013.01); *G06F 2201/84* (2013.01)

(58) Field of Classification Search
   CPC .................................................. G06F 2201/84
   See application file for complete search history.

(56) References Cited

U.S. PATENT DOCUMENTS

| | | | |
|---|---|---|---|
| 8,706,703 B2 | 4/2014 | Factor et al. | |
| 8,849,947 B1* | 9/2014 | Artzi | G06F 9/45558 709/217 |
| 9,135,260 B2 | 9/2015 | Koryakina et al. | |
| 2002/0161860 A1* | 10/2002 | Godlin | G06F 17/30212 709/219 |
| 2009/0043873 A1* | 2/2009 | Barsness | G06F 11/1438 709/223 |
| 2010/0058106 A1* | 3/2010 | Srinivasan | G06F 9/45533 714/2 |
| 2011/0225582 A1* | 9/2011 | Iikura | G06F 11/1415 718/1 |
| 2012/0095965 A1* | 4/2012 | Elron | G06F 3/0604 707/639 |
| 2013/0110778 A1* | 5/2013 | Taylor | G06F 17/30215 707/624 |
| 2015/0127618 A1 | 5/2015 | Alberti et al. | |
| 2015/0186044 A1* | 7/2015 | Sharma | G06F 3/065 711/162 |
| 2016/0124665 A1* | 5/2016 | Jain | G06F 3/0619 711/162 |
| 2017/0357550 A1* | 12/2017 | Jain | G06F 11/1451 |
| 2018/0039548 A1* | 2/2018 | Bryant | G06F 11/1451 |

* cited by examiner

*Primary Examiner* — Mahesh H Dwivedi

(74) *Attorney, Agent, or Firm* — Scully, Scott, Murphy & Presser, P.C.; Christopher Pignato, Esq.

(57) ABSTRACT

A snapshot of data is generated by receiving a plurality of respective file system information sets from a corresponding plurality of virtual machines. Each of the plurality of virtual machines includes one or more storage volumes configured for receiving and storing data to thereby provide stored data. Each of the plurality of respective file information sets comprises file system information for the stored data. A first snapshot is created that includes the file system information for all of the virtual machines of the plurality of virtual machines.

3 Claims, 5 Drawing Sheets

VERSION-CONTROLLING STORAGE VOLUME SNAPSHOTS

FIELD

The present disclosure relates to snapshots (that is, a set of computer files and directories kept in storage as they were some time in the past) and, more, particularly, to snapshots of storage volumes (that is, an identifiable unit of data storage, which can be a removable hard disk, but the storage does not have to be a unit that can be physically removed from a computer or storage system).

BACKGROUND

Computer systems process large volumes of data which may be changed or updated on a recurring basis. In order to track these changes, files located on a data storage device are usually copied, and a system data backup based on these files is created. This enables a user to access previous versions of files, as well as to protect data from possible system failure. Snapshots of the data storage device may be taken to provide for backup of file systems. In the case of a physical computing machine, these snapshots may be generated by an Operating System (OS) running on the physical computing machine.

The current industry trend of virtualization and distribution of computer system resources makes the task of generating backups more complex. For example, a plurality of virtual machines (VMs) may each be configured to provide a software emulation of a single physical computing machine. Virtualization allows running a number of VMs on the same physical computing machine or processor. Each VM instance executes its own OS kernel. Support of VMs is implemented using a VM Monitor and/or a Hypervisor. Due to the existence of multiple VMs on the physical computing machine, scheduling and controlling efficient backups of data among the numerous VMs becomes challenging. Furthermore, each of the VMs has a configuration that can be changed by a user. Thus, it may be necessary to save snapshots of all previous states of a particular VM into a backup.

Typically, data backups are performed by system administrators according to a predetermined backup schedule. In many situations, there are customers who keep tens of snapshots of volumes for tens of thousands of user file systems. Any time a change is made to a file system account, an enormous amount of redundancy is provided just to ensure that a stable backup of all account information is retained.

FIG. 2 is a data flow diagram illustrating a generation of data snapshots in accordance with a prior art approach. A first series of snapshots are taken for a first virtual machine 201, a second series of snapshots are taken for a second virtual machine 202, and an Nth series of snapshots are taken for an Nth virtual machine 203, where N is a positive integer greater than two. The first series of snapshots comprises a first virtual machine first snapshot 211, a first virtual machine second snapshot 212, and a first virtual machine Mth snapshot 213, where M is a positive integer greater than two. Likewise, the second series of snapshots comprises a second virtual machine first snapshot 221, a second virtual machine second snapshot 222, and a second virtual machine Mth snapshot 223. Similarly, the Nth series of snapshots comprises an Nth virtual machine first snapshot 231, an Nth virtual machine second snapshot 232, and an Nth virtual machine Mth snapshot 233. The result is a separate set of snapshots for each of the virtual machines 201, 202, and 203. These snapshots require a lot of storage space and may include redundant information.

Instead of taking daily snapshots, incremental flash copies of the volume of data storage space can be taken. This procedure only copies data that has changed between a source volume and a target volume.

"Version control" is a component of software configuration management. More specifically, version control is the management of changes to documents, computer programs, web sites, and other information collections. Typically, changes are identified by a number or letter code (called the revision number, the revision level, or simply the revision). Typically, each revision is associated with a timestamp and an entity making the change from one revision to the next. Revisions can be compared, restored, and (at least with some types of files) merged. Version control systems (VCS) typically operate as stand-alone applications, but version control is sometimes embedded in various types of software such as word processors and in various content management systems (for example, page history for a wiki page). Version control allows for the ability to revert a document to a previous revision, which is helps allow editors to track each other's edits, correct mistakes, and defend against malicious actions.

SUMMARY

The following summary is merely intended to be exemplary. The summary is not intended to limit the scope of the claims.

A method for generating a snapshot of data, the method comprising receiving a plurality of respective file system information sets from a corresponding plurality of virtual machines. Each of the plurality of virtual machines includes one or more storage volumes configured for receiving and storing data to thereby provide stored data. Each of the plurality of respective file information sets comprises file system information for the stored data. A first snapshot is created that includes the file system information for all of the virtual machines of the plurality of virtual machines.

A computer program product for generating a snapshot of data, in another aspect, may comprise a computer-readable storage medium having a computer-readable program stored therein, wherein the computer-readable program, when executed on a computing device including at least one processor, causes the at least one processor to receive a plurality of respective file system information sets from a corresponding plurality of virtual machines. Each of the plurality of virtual machines includes one or more storage volumes configured for receiving and storing data to thereby provide stored data. Each of the plurality of respective file information sets comprises file system information for the stored data. A first snapshot is created that includes the file system information for all of the virtual machines of the plurality of virtual machines.

An apparatus for generating a snapshot of data, in another aspect, may comprise a computing device including at least one processor and a memory coupled to the at least one processor, wherein the memory comprises instructions which, when executed by the at least one processor, cause the at least one processor to receive a plurality of respective file system information sets from a corresponding plurality of virtual machines. Each of the plurality of virtual machines includes one or more storage volumes configured for receiving and storing data to thereby provide stored data. Each of the plurality of respective file information sets comprises file system information for the stored data. A first snapshot is created that includes the file system information for all of the virtual machines of the plurality of virtual machines.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Some embodiments of the present invention may recognize one, or more, of the following facts, problems and/or drawbacks with respect to the current state of the art: (i) taking the approach of incremental flash copies of the volume of data storage space mitigates the issue of duplicated data wasting space, but other issues are introduced by this approach (for example, the flash copies of the source volume are still dependent upon the original volume from which they were created, thereby rendering storage management much more difficult for a cloud storage administrator; (ii) another problem with taking flash copies is that there are a limited number of flash copies that can be managed by one storage system; (iii) existing user solutions are already exceeding the number of snapshots that can be supported by storage systems; and/or (iv) there exists a need to overcome at least one of the preceding deficiencies and limitations of the related art.

Figure 1:
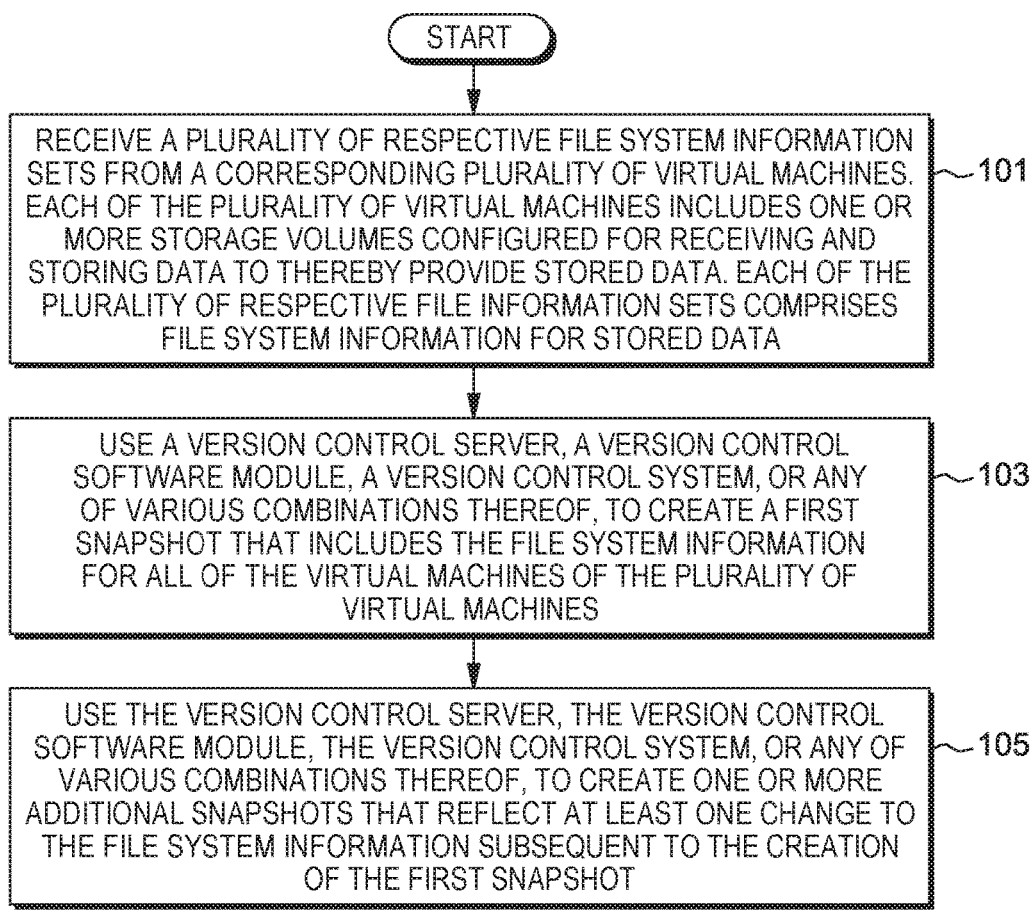
FIG. 1 is a flowchart showing a first exemplary method for generating data snapshots in accordance with one or more embodiments of the present invention.

FIG. 1 illustrates an exemplary method for generating data snapshots in accordance with one or more embodiments of the present invention. The operational sequence commences at block 101 where a plurality of respective file system information sets are received from a corresponding plurality of virtual machines. Each of the plurality of virtual machines includes one or more storage volumes configured for receiving and storing data to thereby provide stored data. Each of the plurality of respective file information sets comprises file system information for the stored data. For illustrative purposes, the file system information may be received on an intermittent, recurring, periodic, or regular basis.

Next, at block 103, a first snapshot is created that includes the file system information for all of the virtual machines of the plurality of virtual machines. The first snapshot is created by a version control server, a version control software module, a version control system, or any of various combinations thereof. For purposes of illustration, the version control server may be a global information tracker (git) server. In this context, the term "global" does not refer to the server operating within, outside, or across any particular geographic boundary, but rather refers to the ability of the server to perform version control tasks in a distributed computing environment. Git is a version control system that is used for software development and other version control tasks. As a distributed revision control system, git is aimed at speed, data integrity, and support for distributed, non-linear workflows. As with most other distributed version control systems, and unlike most client-server systems, every git directory on every computer is a full-fledged repository with complete history and full version-tracking capabilities, independent of network access or a central server.

Although version control is a powerful mechanism for collecting changes in a distributed file system into one location, the idea of using version control to snapshot the state of a file system for a storage volume and then snapshotting the version control server's file system is a novel approach to backing up data. This approach is in contrast to the conventional technique of using a "git bundle" command on a git server, which creates a single file, rather than an entire image of a server like a snapshot would provide.

The operational sequence advances to block 105 where one or more additional snapshots are created using the version control server, the version control software module, the version control system, or any of various combinations thereof. These one or more additional snapshots reflect at least one change to file system information occurring subsequent to the creation of the first snapshot. The one or more changes are tracked at a file level in the file system. It may be noted that multiple file systems will not have their own snapshots. Rather, changes to file system information are kept in the version control server, and snapshots of the version control server are taken.

Illustratively, a cloud server may be used to determine when the first snapshot and the one or more additional snapshots are to be created (blocks 103 and 105). When any of these snapshots are taken, data is pushed up to a network node designated as a snapshot controller. The snapshot controller is configured to have all snapshot data placed or ensconced in a traditional storage volume. This process permits the storage volume to be snapshotted on a user-designated schedule.

Pursuant to the operational sequence of FIG. 1, file system information for the storage volume is tracked using one or more of the version control server, the version control system, or the version control software. This approach works by storing all of the unique data files. If a duplicate or second file is uploaded, the version control server, system, or software simply refers to the existing or first file, rather than newly creating file system information for the second file. Instead of taking data from numerous file systems and copying the data to a snapshot to be stored with several other days of snapshots, the changed data in the file system is pushed to the version control server, system, or software where a single snapshot is created for the most recent state of all the file systems. This allows the changes to be tracked on the version control server, system, or software, rather than each snapshot being stored in its own storage volume, which in turn reduces the resources necessary to store the snapshots.

The procedure of FIG. 1 reduces a total number of snapshots of the one or more storage volumes that are produced, without sacrificing data protection. Data and configuration changes are tracked in the context of a history. This history may be maintained by the version control server. For purposes of illustration, the version control server may be implemented by the git server, or by Mercurial™ version control software, Subversion™ version control software, or any other version control software or system. According to the method of FIG. 1, data redundancy is reduced, a number or quantity of required storage volumes is reduced, and the process of saving backup data is speeded up.

Figure 3:
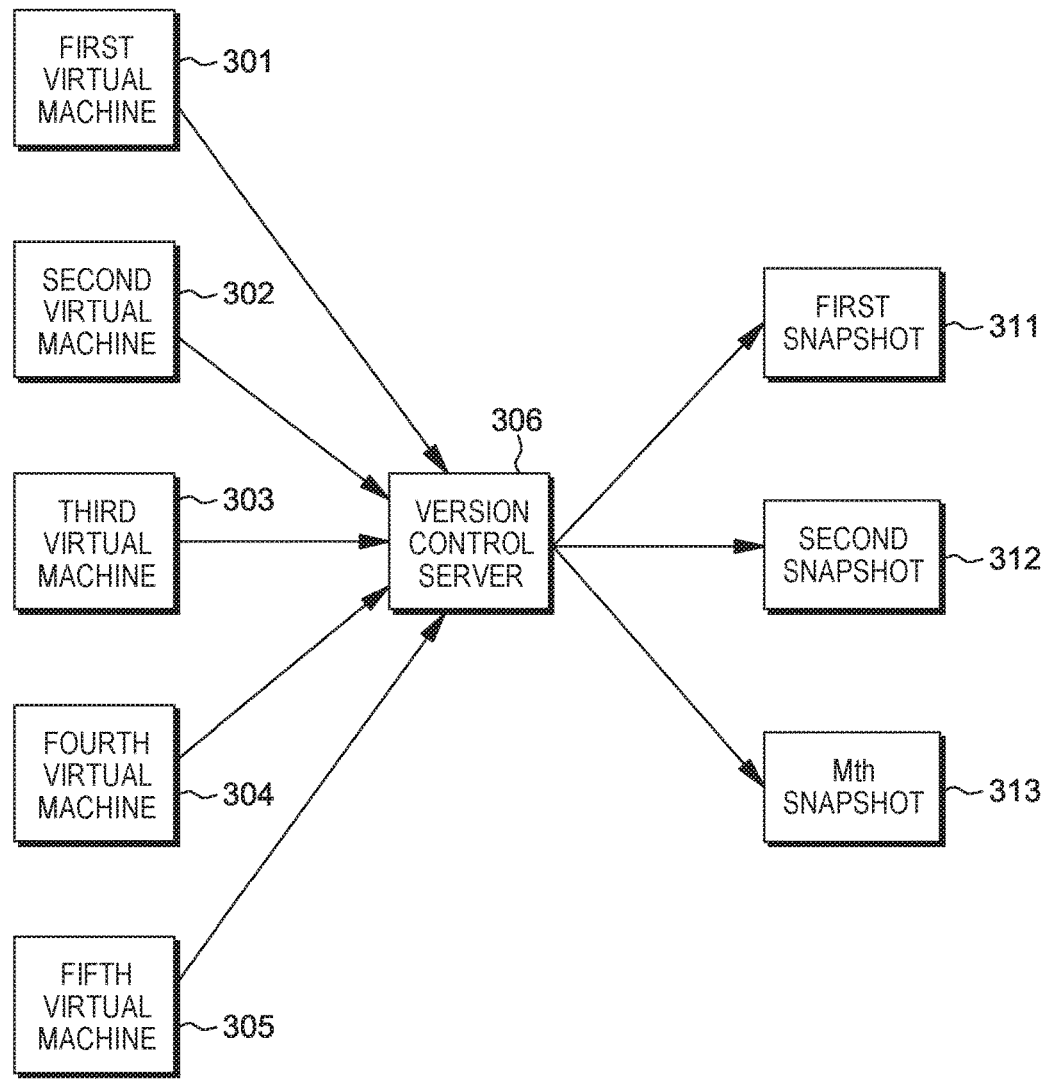
FIG. 3 is a data flow diagram illustrating a generation of data snapshots in accordance with one or more embodiments of the present invention.

FIG. 3 is a data flow diagram illustrating a generation of data snapshots in accordance with one or more embodiments of the present invention. A first virtual machine 301, a second virtual machine 302, a third virtual machine 303, a fourth virtual machine 304, and an Nth virtual machine 305 are each operatively coupled to a version control server 306. N represents a positive integer greater than four. For purposes of illustration, the version control server 306 may be implemented by the git server, or by Mercurial™ version control software, Subversion™ version control software, or any other version control software or system.

Figure 2:
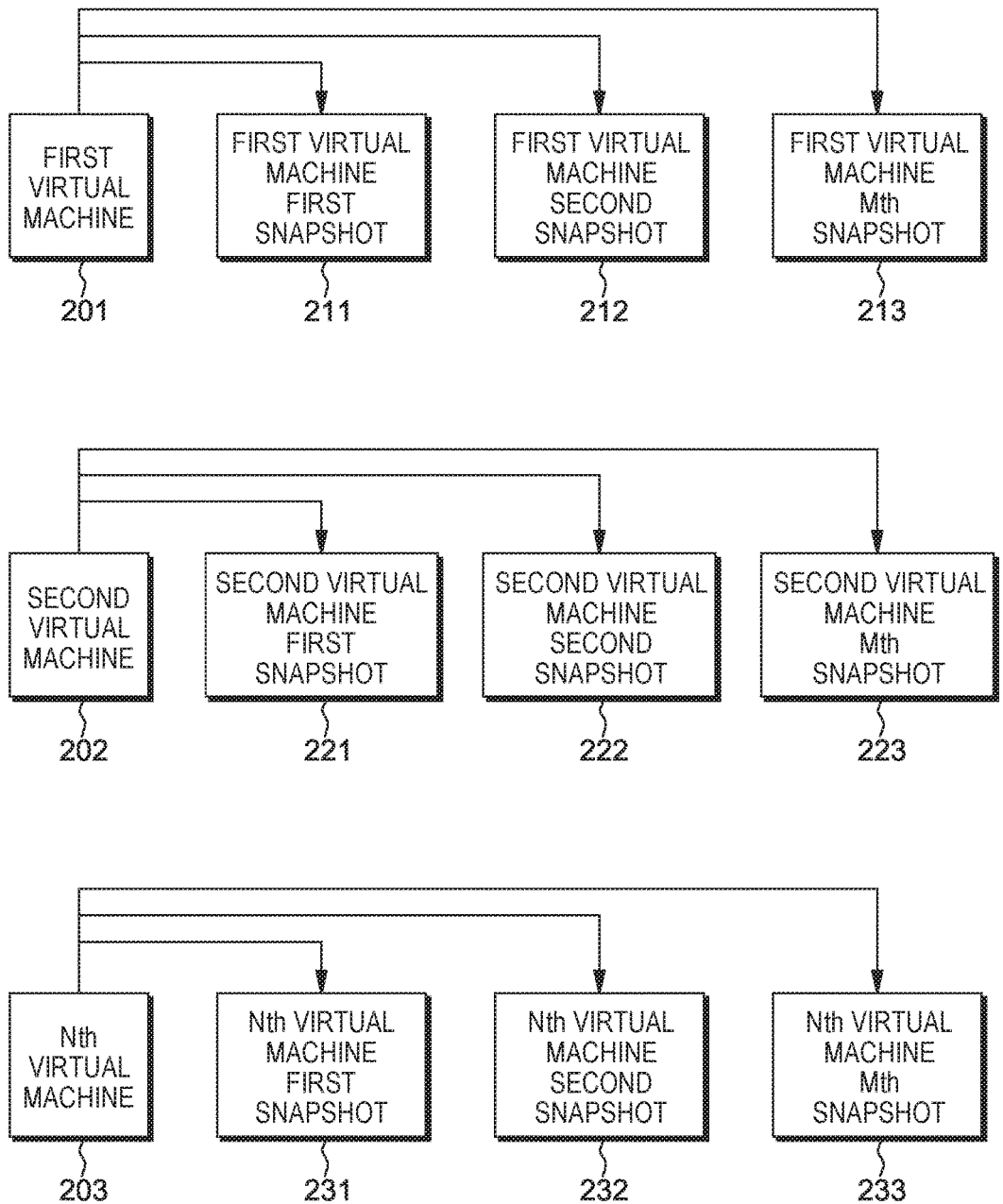
FIG. 2 is a data flow diagram illustrating a generation of data snapshots in accordance with a prior art approach.

In accordance with the procedure of FIG. 1, the version control server 306 (FIG. 3) generates a single series of snapshots for all of the virtual machines 301, 302, 303, 304, and 305. The single series of snapshots includes a first snapshot 311, a second snapshot 312, and an Mth snapshot 313, where M is a positive integer greater than two. The single series of snapshots comprising the first, second, and Mth snapshots 311, 312, 313 takes up less storage space than the multiple snapshot series of FIG. 2 comprising snapshots 211, 212, 213, 221, 222, 223, 231, 232, and 233.

The approaches described with reference to FIGS. 1 and 3 make it possible to accommodate and store many more volume snapshots, while minimizing wasted space and avoiding encountering limits with regard to a maximum number of snapshots that can be created and stored. As a byproduct, this approach also makes it possible to better control a computational load placed on a backup file system while performing snapshotting. Moreover, this approach allows snapshots to be taken without interrupting end users.

Figure 4:
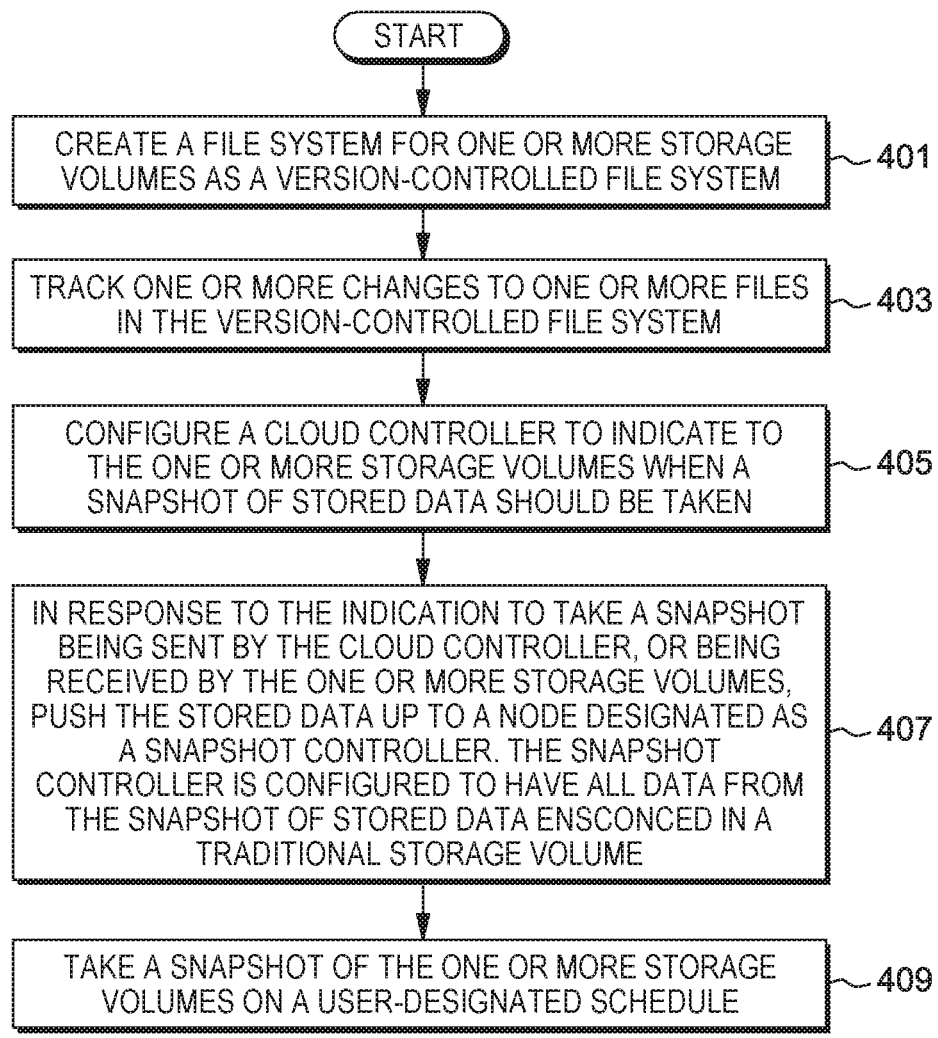
FIG. 4 is a flowchart showing a second exemplary method for generating data snapshots in accordance with one or more embodiments of the present invention.

FIG. 4 illustrates a second exemplary method for generating data snapshots in accordance with one or more embodiments of the present invention. At block 401, a file system for one or more storage volumes is created as a version-controlled file system (rather than a traditional file system) in block storage. Next, at block 403, one or more changes to one or more files in the version-controlled file system are tracked. A cloud controller is configured to indicate to the one or more storage volumes when a "snapshot" of stored data should be taken (block 405). In response to the indication to take a snapshot being sent by the cloud controller, or being received by the one or more storage volumes, or being sent and received, the stored data is pushed up to a node or system designated as a "snapshot controller" (block 407). The snapshot controller is configured to have all data from the snapshot of stored data placed or ensconced in a traditional storage volume.

The operational sequence of FIG. 4 advances to block 409 where the one or more storage volumes are snapshotted on whatever schedule is most suitable for a storage administrator. This approach has many advantages over conventional approaches. First, the bandwidth required to send the version-controlled data is far less than the bandwidth required to create a full snapshot of the one or more storage volumes. Since the version control snapshots occur in real time, the data may be pushed to the snapshot controller at any point in time without interrupting users.

The version-control approaches described in FIGS. 1, 3, and 4 allow for much finer grained recovery of data than is currently provided by snapshots, as with a snapshot one obtains a point-in-time picture of all the data. Thus, these version-control approaches provide fine grained change control along with the high level safety of a full point-in-time snapshot. The fact that the version control is performed in real time and is non-disruptive provides cloud storage administrators with greater flexibility in terms of scheduling the push of data for snapshotting to minimize the overall impact on the cloud. Administrators could also implement multiple snapshot controllers to spread the load of snapshotting across multiple nodes and multiple storage back-ends.

Some embodiments of the present invention may include one, or more, of the following features, characteristics, advantages and/or operations: (i) receiving, from a plurality of virtual machines, file system information sets respectively corresponding to file system information for the respectively corresponding virtual machine; (ii) creating a first snapshot that include the file system information of all of the file system information for all of the virtual machines of the plurality of virtual machines; (iii) the receipt of file information sets is performed intermittently over time; (iv) creating a plurality of additional snapshots using versioning control, with the plurality of additional snapshots reflecting changes to file system information occurring subsequent to creation of the first snapshot; and/or (v) the creation of the first snapshot is performed by a git server.

Some embodiments of the present invention may include one, or more, of the following characteristics, operations, advantages and/or features: (i) multiple file systems do not have their own dedicated snapshots, but, rather, changes are kept in a single version control server and then snapshots of the server would be created intermittently over time to account for all changes in all of the multiple file systems; (ii) the file system for a volume is tracked in a version control system; (iii) this works by storing all of the unique files and if a duplicate is uploaded, the system simply refers to the existing file rather than creating a second one; (iv) instead of taking the data from the numerous file systems and copying it to a snapshot to be stored with several other days of snapshots, the changed data in the file system would be pushed to the version control server, where a single snapshot is created for the most recent state of all the file systems; (v) allows the changes to be tracked on the version control server/repository rather than each snapshot being stored in its own volume; (vi) reduces the resources necessary to store the snapshots.

Figure 5:
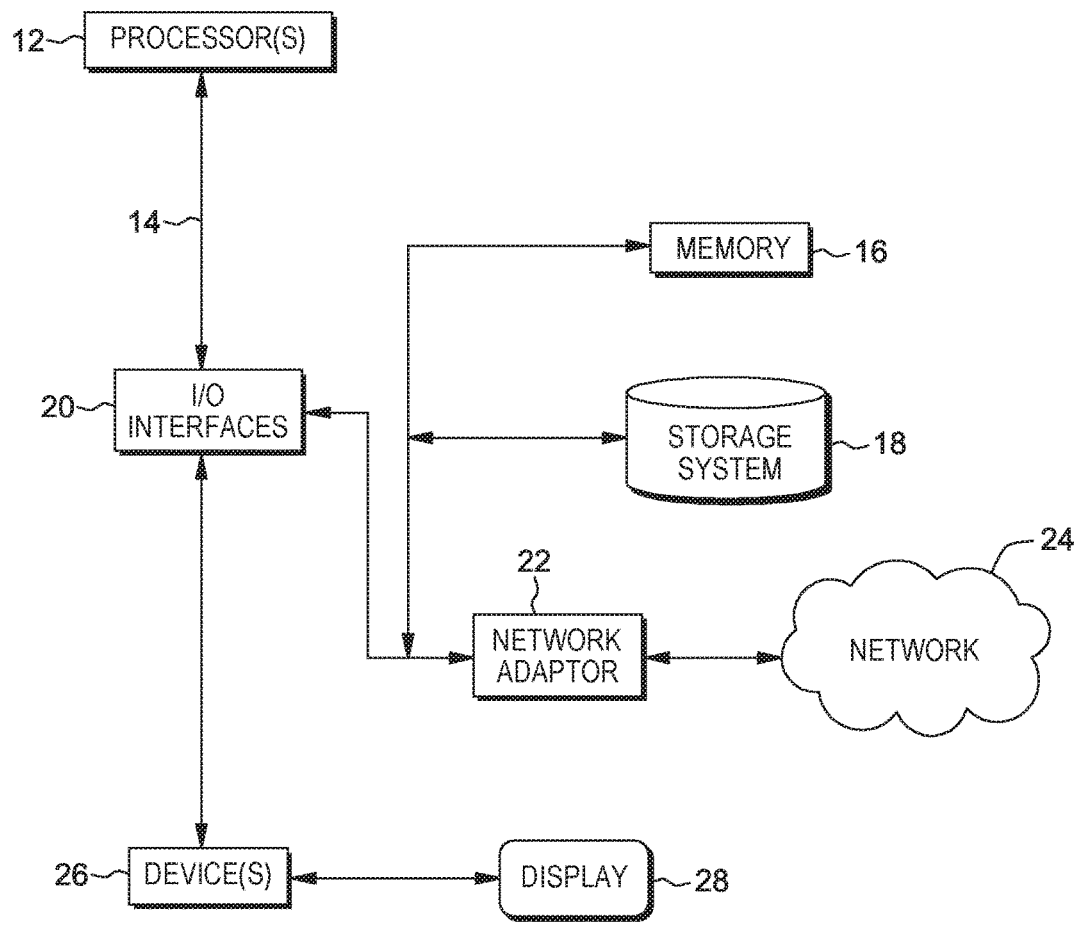
FIG. 5 illustrates an exemplary apparatus for generating data snapshots in accordance with one or more embodiments of the present invention.

FIG. 5 illustrates an exemplary apparatus for generating data snapshots in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for generating a snapshot of data, the method comprising:
   receiving, at a processor running a version control process at a computer, a plurality of respective file system information sets from a corresponding plurality of virtual machines, each of the plurality of virtual machines including one or more storage volumes configured for receiving and storing data to thereby provide stored data, and each of the plurality of respective file information sets comprising file system information for the stored data, the file system information being version controlled to provide a version-controlled file system for the stored data at the computer, said processor running said version control process tracking one or more changes to one or more files at a file system level in the version-controlled file system;
   creating, by the processor running the version control process, a first version-controlled snapshot of the version-controlled file system that includes the file system information for all of the virtual machines of the plurality of virtual machines,
   creating one or more additional snapshots of the version-controlled file system using versioning control, the additional snapshots reflecting changes to the file system information subsequent to the creation of the first snapshot;
   configuring a cloud controller to send an indication to the one or more storage volumes when the first version-controlled snapshot should be taken, and configuring the cloud controller to send the indication when the one or more additional snapshots should be taken;
   configuring a node as a snapshot controller for ensconcing all version controlled data from the first version-controlled snapshot and the one or more additional snapshots into the one or more storage volumes; and
   pushing the stored version controlled data to the snapshot controller in response to the cloud controller sending the indication, or in response to the one or more storage volumes receiving the indication,
   wherein a bandwidth required to send the version controlled data is less than the bandwidth required to create a full snapshot of the one or more storage volumes enabling storage of multiple volume snapshots while avoiding any limit imposed with regards to a maximum number of snapshots that can be created.

2. A computer program product for generating a snapshot of data, the computer program product comprising a computer-readable storage medium having a computer-readable program stored therein, wherein the computer-readable program, when executed on a computing device including at least one processor running a version control process, causes the at least one processor to:
receive a plurality of respective file system information sets from a corresponding plurality of virtual machines, each of the plurality of virtual machines including one or more storage volumes configured for receiving and storing data to thereby provide stored data, and each of the plurality of respective file information sets comprising file system information for the stored data, the file system information being version controlled to provide a version-controlled file system for the stored data at the computer, said processor running said version control process tracking one or more changes to one or more files at a file system level in the version-controlled file system;
create a first version-controlled snapshot of the version-controlled file system that includes the file system information for all of the virtual machines of the plurality of virtual machines,
create one or more additional snapshots of the version-controlled file system using versioning control, the additional snapshots reflecting changes to the file system information subsequent to the creation of the first snapshot;
wherein the computer-readable program causes the at least one processor to cause a cloud controller to:
send an indication to the one or more storage volumes when the first version-controlled snapshot should be taken, and configuring the cloud controller to send the indication when the one or more additional snapshots should be taken;
configure a node as a snapshot controller for ensconcing all version controlled data from the first version-controlled snapshot and the one or more additional snapshots into the one or more storage volumes; and
push the stored version controlled data to the snapshot controller in response to the cloud controller sending the indication, or in response to the one or more storage volumes receiving the indication,
wherein a bandwidth required to send the version controlled data is less than the bandwidth required to create a full snapshot of the one or more storage volumes enabling storage of multiple volume snapshots while avoiding any limit imposed with regards to a maximum number of snapshots that can be created.

3. An apparatus for generating a snapshot of data, the apparatus comprising a computing device including at least one processor running a version control process and a memory coupled to the at least one processor, wherein the memory comprises instructions which, when executed by the at least one processor, cause the at least one processor to:
receive a plurality of respective file system information sets from a corresponding plurality of virtual machines, each of the plurality of virtual machines including one or more storage volumes configured for receiving and storing data to thereby provide stored data, and each of the plurality of respective file information sets comprising file system information for the stored data, the file system information being version controlled to provide a version-controlled file system for the stored data at the computer, said processor running said version control process tracking one or more changes to one or more files at a file system level in the version-controlled file system;
create a first version-controlled snapshot of the version-controlled file system that includes the file system information for all of the virtual machines of the plurality of virtual machines,
create one or more additional snapshots of the version-controlled file system using versioning control, the additional snapshots reflecting changes to the file system information subsequent to the creation of the first snapshot;
cause a cloud controller to send an indication to the one or more storage volumes when the first version-controlled snapshot should be taken, and configuring the cloud controller to send the indication when the one or more additional snapshots should be taken;
configure a node as a snapshot controller for ensconcing all version controlled data from the first version-controlled snapshot and the one or more additional snapshots into the one or more storage volumes; and
push the stored version controlled data to the snapshot controller in response to the cloud controller sending the indication, or in response to the one or more storage volumes receiving the indication,
wherein a bandwidth required to send the version controlled data is less than the bandwidth required to create a full snapshot of the one or more storage volumes enabling storage of multiple volume snapshots while avoiding any limit imposed with regards to a maximum number of snapshots that can be created.

* * * * *